Albert B. Welty, Jr. INVENTOR

United States Patent Office 3,674,427
Patented July 4, 1972

3,674,427
PROCESS FOR DECOMPOSING AMMONIUM SULFATE INTO AMMONIUM BISULFATE AND AMMONIA
Albert B. Welty, Jr., Westfield, N.J., assignor to Esso Research and Engineering Company
Filed Jan. 30, 1970, Ser. No. 7,108
Int. Cl. C01c 1/24, 1/02, 1/12
U.S. Cl. 23—119               6 Claims

ABSTRACT OF THE DISCLOSURE

Ammonium bisulfate and ammonia are produced by thermal decomposition of ammonium sulfate. An aqueous slurry of ammonium sulfate is introduced into a flowing stream of hot combustion gases in a decomposition zone. The water is evaporated and the ammonium sulfate is decomposed into gaseous ammonia and molten ammonium bisulfate, which is in the form of droplets suspended in the gas stream. The ammonium bisulfate is separated from the gas stream, and a gas mixture comprising ammonia and hot combustion gases is withdrawn from the decomposition zone.

BACKGROUND OF THE INVENTION

This invention relates to a process for decomposition of ammonium sulfate into ammonium bisulfate and ammonia.

The decomposition of ammonium sulfate into ammonium bisulfate and ammonia is well known. This reaction is quite endothermic, absorbing approximately 30,000 calories per gram mole of ammonium sulfate decomposed. The ammonium sulfate starting material is usually in the form of an aqueous solution or slurry, and considerable additional heat input is required to evaporate the water which accompanies the ammonium sulfate. For example, in an aqueous solution containing about 65% by weight of ammonium sulfate and 35% by weight of water, which corresponds to 4 moles of water for each mole of ammonium sulfate, it is necessary to supply about 49,000 additional calories of heat for each mole of ammonium sulfate decomposed, merely to evaporate the water present and to raise the water vapor to a decomposition temperature of about 800° F. If a more dilute solution of ammonium sulfate is used, of course the necessary heat input is correspondingly higher. Because of the high heat requirements, thermal decomposition processes for ammonium sulfate have not proved economical to date, even through numerous such processes have been suggested in the literature. Thus, although the product ammonium bisulfate is potentially a valuable acidifying agent in various industrial processes, such as the treatment of phosphate rock in the manufacture of fertilizers, as disclosed in U.S. Pat. No. 3,172,751, and the liberation of sulfur dioxide from absorber effluent solutions in the desulfurization of flue gas, as disclosed in U.S. Pat. No. 2,405,747, processes requiring the thermal decomposition of ammonium sulfate as a step thereof have seldom proved to be commercially attractive.

The decomposition temperature for ammonium sulfate, as reported in the literature, is generally in the range of about 300° to about 500° C. Decomposition takes place at temperatures below 300° C., according to some observers, but decomposition at such temperatures proceeds at a slower rate than at temperatures above 300° C. Temperatures above about 500° C. are avoided, because as the temperatures rises further, the product ammonium bisulfate is decomposed further into ammonium pyrosulfate and water vapor, and on still further temperature rise, ammonium pyrosulfate may be decomposed into sulfur dioxide, additional ammonia, and ammonium sulfate. Still higher temperatures may result in the formation of nitrogen and sulfur dioxide.

The feasibility of thermal decomposition processes for ammonium sulfate depends in large measure on two factors: the source of heat used, and the form of the ammonium sulfate feed. Heat sources may be subdivided generally into two categories: direct and indirect. Heating by indirect heat exchange is shown in U.S. Pat. No. 3,243,261. Indirect heat exchange is undesirable because the heat exchange medium must be at a temperature higher than the decomposition temperature of ammonium sulfate, resulting in inefficient heat utilization and because the walls of the heat exchange surfaces are subject to severe corrosive attack by the molten product ammonium bisulfate with which they are in contact. Hence, direct heat exchange is preferred.

Direct heating with superheated steam is illustrated in U.S. Pat. No. 2,405,747, and direct heating with flue gas is suggested in the aforementioned U.S. Pat. No. 3,243,261. Direct heat exchange, while preferable to indirect heat exchange from the standpoints of heat utilization and corrosion, nevertheless has some operating limitations. The use of superheated steam as a heat source is relatively uneconomical, because either the superheated steam must be supplied at a temperature only slightly above the decomposition temperature, requiring large quantities of steam, or else it must be superheated to a high degree at great expense. Hot combustion gas is a cheaper source of direct heating, but the combustion temperature is so high that ammonium sulfate would be decomposed into undesirable side reaction products, as described above. If combustion gas is used, the ammonium sulfate feed must be protected from direct contact with the combustion gas at flame temperature. In other words, the combustion gas must be cooled considerably before it is contacted with ammonium sulfate.

The art has preferred an anhydrous ammonium sulfate feed rather than an aqueous feed, as illustrated by the aforementioned U.S. Pats. Nos. 2,405,747 and 3,243,261. The water initially present is evaporated and the resulting solid anydrous ammonium sulfate is introduced into the decomposition zone. Such mode of operation has the obvious advantage that the heat required for evaporation can be supplied at a relatively low temperature. The solid ammonium sulfate obtained in the evaporator is difficult to handle, however. One solution to this difficulty is to dissolve the ammonium sulfate in molten ammonium bisulfate, as suggested in U.S. Pat. No. 3,243,261. This requires the handling of large volumes of hot corrosive ammonium bisulfate and reduces the throughput capacity of the system.

To avoid the difficulties in handling solid anhydrous ammonium sulfate, it is imperative to provide a process which will permit evaporation of water and decomposition of ammonium sulfate to be carried out economically in a single step. This requires direct heat exchange using a cheap heat source. At the same time, excessively high temperatures which would cause undesirable decomposition of ammonium sulfate must be avoided.

SUMMARY OF THE INVENTION

It has been found according to this invention that aqueous solutions and slurries of ammonium sulfate can be decomposed into molten ammonium bisulfate and ammonia in a single operation without significant decomposition of ammonium bisulfate. According to this invention, this is accomplished by injecting a fluid mixture comprising ammonium sulfate and water into a stream of hot combustion gases in a decomposition zone; evaporating said water and converting the ammonium sulfate into ammonium bisulfate and ammonium, thereby forming a gas mixture of hot combustion gases and ammonia having droplets of molten ammonium bisulfate suspended therein; separating the ammonium bisulfate from the gas mixture; collecting the ammonium bisulfate in a molten body; withdrawing ammonium bisulfate from the molten body; and withdrawing a gas mixture of hot combustion gases and ammonia from the decomposition zone.

THE DRAWING

This invention will now be described in detail with reference to the accompanying drawing, in which.

DESCRIPTION OF THE PREFERRED EMBODIMENT

Figure 1:
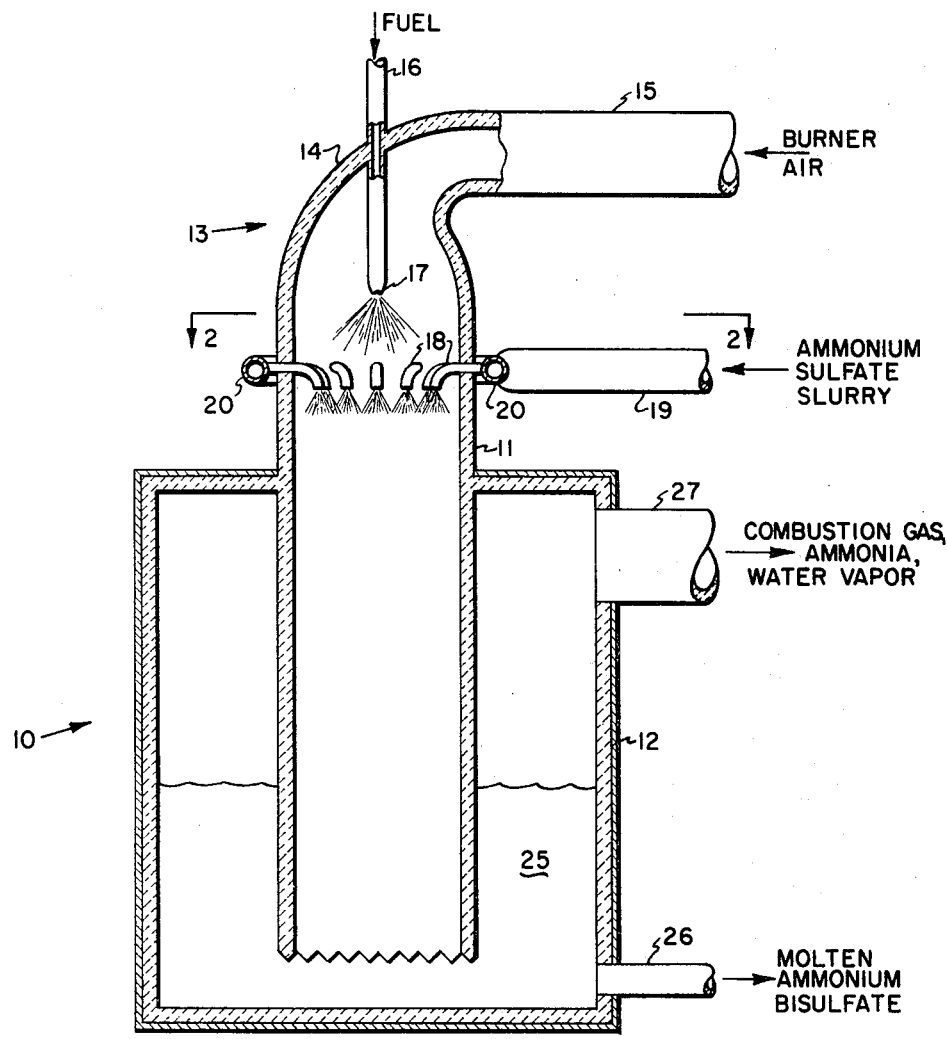
FIG. 1 is a vertical sectional view of an apparatus for carrying out the process of the present invention.
Figure 2:
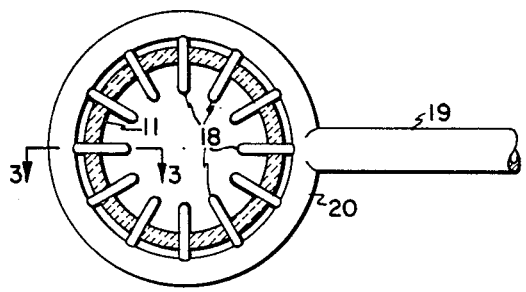
FIG. 2 is a sectional view taken along line 2—2 of FIG. 1, showing the spray nozzles for introducing ammonium sulfate slurry in elevation.

Referring now to FIG. 1, 10 is a decomposer comprising a substantially vertical decomposition tube 11 in which aqueous ammonium sulfate is decomposed into molten ammonium bisulfate and gaseous ammonia, and an essentially upright cylindrical vessel 12 which serves as a separator for removing molten ammonium bisulfate from the gas stream and as a receptacle for collecting the molten ammonium bisulfate product. Decomposition tube 11 is open at both ends. The tube 11 extends through the top of vessel 12, terminating at its upper end above vessel 12 and terminating at its lower end inside vessel 12 near the bottom thereof. Decomposition tube 11 is preferably ceramic or ceramic-lined steel, and vessel 12 is preferably made of ceramic-lined steel, in order to withstand the corrosive ammonium bisulfate product and the high operating temperatures.

A burner 13 is located at the upper end of decomposition tube 11. This burner includes an elbow-shaped conduit section 14 which is of suitable refractory construction, e.g., ceramic or ceramic-lined steel. Conduit section 14 may be integral with decomposition tube 11 as shown, or may be a separate unit which is attached to tube 11 by suitable means. The conduit section may include straightening vanes (not shown) to insure air flow parallel to the axis of tube 11. An air conduit 15 attached to elbow section 14 supplies combustion air to the burner 13. Fuel, preferably a liquid fuel such as fuel oil, diesel oil, or the like, is supplied to the burner 13 through fuel supply line 16, which terminates in burner nozzle 17. Details of the intimate mixing of fuel and air are not shown, since these are well known in the art. The combustion of fuel in burner 13 provides a flowing stream of hot combustion gases for the decomposition of ammonium sulfate. This gas stream flows downwardly through tube 11.

The decomposer 10 includes a series of spray nozzles 18, located at spaced intervals around the circumference of decomposition tube 11, for injecting an aqueous slurry or solution of ammonium sulfate axially into the hot combustion gas stream flowing through tube 11. The nozzles may be arranged in one or more circles. When only one circle is used, as shown in the drawing, this circle has a radius about 0.70 times the inner radius of tube 11. A supply conduit 19 and a circular manifold 20 surrounding tube 11 and connected to conduit 19, supply ammonium sulfate slurry or solution to nozzles 18.

Figure 3:
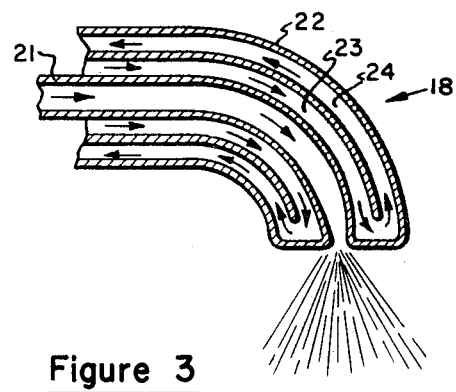
FIG. 3 is a vertical sectional view, taken along line 3—3 of FIG. 2, showing an individual ammonium sulfate spray nozzle in section.

The detail of nozzles 18 may be best seen in FIG. 3. Each of the nozzles 18 includes a central tube 21 for conveying the ammonium sulfate slurry, and a water jacket 22 surrounding the central tube 21. The water jacket 22 includes two concentric passageways 23 and 24 for the supply and return, respectively, of cooling water.

The solution or slurry of ammonium sulfate is introduced in droplet form into the combustion gas stream. The water content of the slurry is vaporized and then the ammonium sulfate content is decomposed into ammonium bisulfate and ammonia by the heat of the hot combustion gases (principally nitrogen and carbon dioxide). Ammonia and water vapor are formed, with droplets of molten ammonium bisulfate suspended in the gas mixture. This gas mixture flows downwardly through tube 11.

Referring again to FIG. 1, vessel 12 in normal operation contains a body 25 of molten ammonium bisulfate product. The lower end of decomposition tube 11 terminates below the surface of this body 25. The gas stream flowing through tube 11 is bubbled through the body 25 of ammonium bisulfate. Entrained ammonium bisulfate is thereby separated from the gas stream and collected in body 25. Vessel 12 also includes an outlet conduit 26 near the bottom thereof for removing molten ammonium bisulfate, and an overhead exit line 27 for a gas mixture of hot combustion gases, steam, and ammonia.

It is not necessary to bubble the gas stream through the body 25 of molten ammonium bisulfate in order to cause the droplets of ammonium bisulfate to settle out. The drop in gas velocity as the gas stream passes from tube 11 to vessel 12 is sufficient to cause the desired settling out of the suspended ammonium bisulfate droplets.

In carrying out the decomposition of ammonium sulfate according to the present invention, a fluid mixture comprising ammonium sulfate and water (i.e., an aqueous solution or slurry, preferably the latter) of ammonium sulfate is introduced from conduit 19 into a tubular decomposition zone which is enclosed by decomposition tube 11. This slurry typically contains both dissolved and undissolved ammonium sulfate, and water. The slurry may also contain dissolved ammonium bisulfate, as for example when the feed for decomposer 10 is produced by reacting ammonium bisulfite with an axcess of ammonium bisulfate. The amount of water can vary over wide limits, from enough to dissolve all ammonium sulfate present to only sufficient to produce a readily pumpable and flowable slurry. This will amount to about 40 to 50% by volume solids (i.e., undissolved ammonium sulfate) based on the total slurry. Generally, it is preferred to use the minimum amount of water in order to minimize the heat load and therefore the amount of fuel and the size of apparatus required. The ammonium sulfate slurry has a typical inlet temperature of about 200° to 225° F. and a typical pressure at the inlets to the nozzles of about 100 p.s.i.g.; higher or lower temperatures and pressures can be used. Ordinarily, the ammonium sulfate feed is an aqueous slurry containing from about 15 to 30% by weight of water and from 20 to 35% by weight of undissolved ammonium sulfate. Virtually all of the ammonium bisulfate, when present, is in solution, since ammonium bisulfate is more soluble than ammonium sulfate.

A stream of hot combustion gases, formed by the combustion of liquid fuel in burner 13, continuously flows downwardly through the decomposition tube 11. A slight excess of air is preferably used, forming a combustion gas containing carbon dioxide, water vapor, nitrogen, and small amounts of oxygen. The temperature of the hot combustion gases is typically about 3000° to about 3500° F.

An aqueous slurry of ammonium sulfate (which may contain ammonium bisulfate as previously mentioned) is introduced into the hot combustion gas stream in tube 11 through nozzles 18. Evaporation of the water occurs first. As long as any water remains in the droplets, the temperature of the droplets remains at approximately the boiling point of water and no ammonium sulfate decomposes. This evaporation cools the combustion gas markedly. As soon as all of the water has evaporated, the temperature of the droplets rises rapidly to that of the now-cooled combustion gases, and decomposition begins.

The decomposition of ammonium sulfate absorbs additional heat, thus cooling the combustion gases further at a rapid rate. The product ammonium bisulfate is in the form of molten droplets suspended in the combustion gas stream. The temperature of the gas stream at the bottom of tube 11 is typically about 750° to 800° F.

The gas mixture is bubbled through the molten body 25 of ammonium bisulfate. The droplets of molten ammonium bisulfate entrained in the gas stream in tube 11 are removed as the gas mixture bubbles through the molten body 25, and the ammonium bisulfate is collected in molten body 25. Molten ammonium bisulfate is continuously withdrawn from body 25 through liquid outlet pipe 26. A gas mixture comprising ammonia, steam, and combustion gases (principally carbon dioxide and nitrogen) is removed through gas exit line 27. Ammonia can be recovered from the gas mixture in exit line 27 by means known in the art.

Decomposition of the product ammonium bisulfate into undesired side reaction products, such as ammonium pyrosulfate and sulfur trioxide, is minimal in the present process. A prime reason for this is the rapid cooling of the hot combustion gases in tube 11 to a temperature below the minimum at which significant side reactions will occur. Another reason is that the large amounts of water in the decomposition zone suppress the formation of ammonium pyrosulfate, since water is a product of the decomposition of ammonium bisulfate into ammonium pyrosulfate.

This invention will now be described further with reference to the following example.

EXAMPLE

Fuel oil is burned with a slight excess of air in the combustion tube 11 of a decomposer 10 similar to that shown in the drawing. This forms a stream of hot combustion gases comprising nitrogen, water vapor, carbon dioxide, and a small amount of free oxygen, having a temperature of about 3200° F. The total flow rate of this stream is 4590 pound moles per hour. An aqueous slurry of ammonium sulfate, containing 292 pounds moles of dissolved ammonium sulfate, 297 pound moles of ammonium bisulfate, 301 pound moles of ammonium sulfate in suspension, and 2420 pound moles of water, is introduced into the gas stream through nozzles 18 at 200° F. and 100 p.s.i.g. The water is evaporated and the ammonium sulfate is decomposed into molen droplets of ammonium bisulfate which are suspended in the gas stream. Stream quantities in the gas stream below nozzles 18, in pound moles per hour, are as shown in Table I below.

TABLE I

| | Moles/hour |
|---|---|
| Combustion gas [1] | 4590 |
| Ammonia | 593 |
| Water vapor [2] | 3000 |
| Ammonium bisulfate (molten droplets) | 890 |

[1] Includes water vapor formed as a combustion product.
[2] Includes only water vapor formed by evaporation from ammonium sulfate slurry. Does not include water vapor formed by combustion of fuel.

The gas stream is bubbled through a body 25 of molten ammonium bisulfate. This separates the entrained ammonium bisulfate droplets from the gas stream. The ammonium bisulfate thus separated is collected in molten body 25 and is withdrawn from the decomposer at the rate of 890 pound moles per hour through outlet 26. The gas mixture, containing combustion gases (nitrogen and carbon dioxide), ammonia and water vapor, is withdrawn from the upper portion of vessel 12 via outlet 27 at a flow rate of 8180 pound moles per hour.

The above example is illustrative of one specific embodiment of the invention. Variations, some of which have already been suggested, can be made without departing from the scope and spirit of this invention. The apparatus need not have the precise form illustrated. For example, the decomposition tube 11 need not be vertical, and may terminate above the surface of the molten body of ammonium bisulfate, provided the velocity of the gas stream is reduced sufficiently to cause the suspended ammonium bisulfate to settle out (i.e., to less than about 5 feet per second) as the stream leaves the decomposition tube.

The present process and apparatus may be used whenever pure anhydrous ammonium bisulfate is desired, but are particularly useful in flue gas desulfurization processes such as that shown in U.S. Pat. No. 2,405,747 as a replacement for the evaporator and ammonium sulfate decomposer shown therein.

What is claimed is:

1. A process for decomposing ammonium sulfate into ammonium bisulfate and ammonia which comprises:
    (a) burning a fluid fuel in air in a tubular decomposition zone and passing the resulting flowing stream of hot combustion gas axially through said zone;
    (b) injecting a fluid mixture comprising ammonium sulfate and water in droplet form axially into said flowing stream of hot combustion gases in said decomposition zone, the temperature of said gases prior to injection being above the decomposition temperature of ammonium sulfate;
    (c) evaporating said water, converting said ammonium sulfate into ammonium bisulfate and ammonia, and cooling said gases to a temperature below the decomposition temperature of ammonium bisulfate, thereby forming a gas mixture of hot combustion gases, ammonia, and water vapor having droplets of molten ammonium bisulfate suspended therein;
    (d) separating said ammonium bisulfate from said gas mixture;
    (e) collecting said ammonium bisulfate in a molten body of ammonium bisulfate;
    (f) withdrawing ammonium bisulfate from said molten body; and
    (g) withdrawing said gas mixture comprising hot combustion gases, ammonia, and water vapor from said decomposition zone.

2. A process according to claim 1 in which said fluid mixture comprising ammonium sulfate and water is an aqueous slurry containing both dissolved and undissolved ammonium sulfate.

3. A process according to claim 1 in which said aqueous fluid mixture is injected concurrently into said stream of hot combustion gas.

4. A process according to claim 1 in which said stream of hot combustion gases flows downwardly and said fluid mixture is injected downwardly into said stream.

5. A process according to claim 1 in which said stream comprising hot combustion gases, ammonia, and water vapor is bubbled through said molten body of ammonium bisulfate.

6. A process for decomposing ammonium sulfate into ammonium bisulfate and ammonia which comprises:
    (a) burning a fluid fuel in air in a vertical tubular decomposition zone and passing the resulting stream of hot combustion gases downwardly through said decomposition zone;
    (b) injecting a fluid mixture comprising ammonium sulfate and water in droplet form downwardly into said stream of hot combustion gases in said decomposition zone, the temperature of said gases being above the decomposition temperature of ammonium sulfate;
    (c) evaporating said water, converting said ammonium sulfate into ammonium bisulfate and ammonia, and cooling said gases to a temperature below the decomposition temperature of ammonium bisulfate, thereby forming a gas mixture of hot combustion gases, ammonia, and water vapor having droplets of molten ammonium bisulfate suspended therein;

(d) bubbling said gas mixture through a molten body of ammonium bisulfate, thereby separating said droplets of ammonium bisulfate from said gas mixture and collecting the ammonium bisulfate in said molten body;

(e) withdrawing ammonium bisulfate from said molten body; and (f) withdrawing said gas mixture comprising hot combustion gases, ammonia, and water vapor from said decomposition zone.

References Cited

UNITED STATES PATENTS

| 2,155,119 | 4/1939 | Ebner | 23—1 |
| 2,405,747 | 8/1946 | Hixson | 23—178 |
| 3,243,261 | 3/1966 | Deiters | 23—193 X |
| 3,383,170 | 5/1968 | Furkert et al. | 23—193 X |

EDWARD STERN, Primary Examiner

U.S. Cl. X.R.

23—1 B, 1 D, 193, 196, 277